Figure 1:
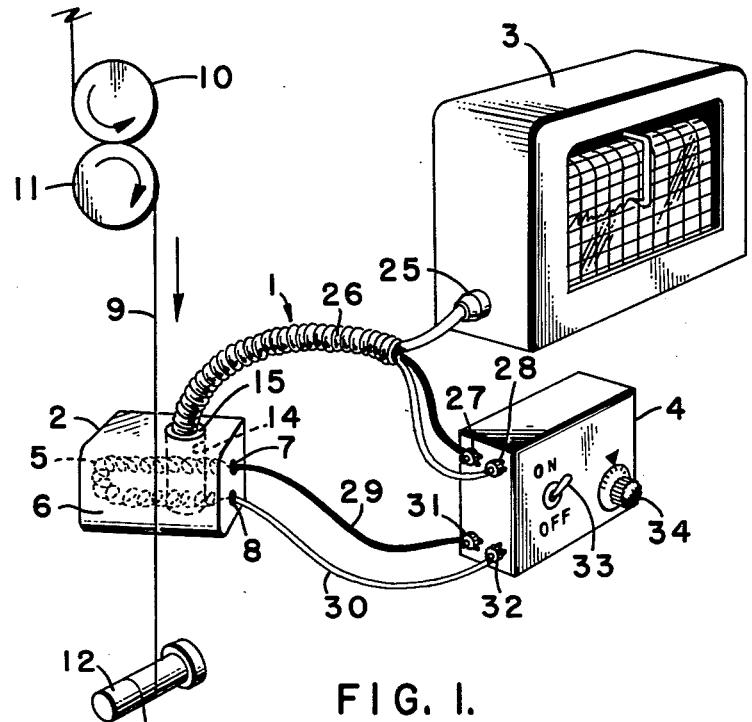

June 1, 1965 P. D. BARLOW 3,186,227
THERMOELECTRIC SENSING APPARATUS
Filed June 9, 1961

*INVENTOR.*
PAUL D. BARLOW
BY *Stanley M. Tarter*
ATTORNEY

United States Patent Office 3,186,227
Patented June 1, 1965

3,186,227
THERMOELECTRIC SENSING APPARATUS
Paul D. Barlow, Pensacola, Fla., assignor, by mesne assignments, to Monsanto Company, a corporation of Delaware
Filed June 9, 1961, Ser. No. 116,054
1 Claim. (Cl. 73—359)

This invention relates to thermoelectric sensing apparatus and, more particularly, relates to a novel composite thermocouple-thermistor device including a plurality of different temperature sensor means arranged to provide separate but accurately related temperature measurements.

Thermocouple and thermistor devices are known to possess desirable temperature detecting or sensing characteristics, and they have a wide range of application. They are used competitively and are preferred one over the other according to sensitivity, speed of response, and cost considerations. Thermocouple and thermistor devices are commonly used in conjunction with temperature recorders and controllers.

In some industrial applications, a temperature recorder associated with a thermocouple device, and a temperature controller associated with a thermistor device, are both utilized in a command thermal arrangement which also includes a controlled heater device.

One such arrangement, for example, is used in the processing of nylon yarn, where a heater device serves to impart heat to a yarn being forwarded to and passed over the heater device prior to stretching the yarn to improve its physical properties. A thermistor device having a probe member connected to the heater device functions to sense the temperature of the heater device and to send a resistivity signal to a controller device. The controller device, connected to the heater device through suitable leads, acts responsively to this signal to control the temperature of the heater device of a predetermined degree through a potentiometer, an amplifier, a relay, and a contact switch. A thermocouple device, also in contact with the heater device through a corresponding probe member, serves to sense the temperatrue of the heater device and to send an E.M.F. signal to a recorder device connected to the heater device through appropriate leads. The recorder device acts responsively to this E.M.F. signal to continuously record the temperature of the heater device through a potentiometer, an amplifier, a slide wire, a pen, and a driven chart. In such an arrangement it is common practice for an operator to refer to the temperature reading on the recorder device to serve as a reliable cross-reference of the performance of the controller device at any one time.

Many problems are encountered in the application of a thermal arrangement of the type described. One such problem is due primarily to the fact that thermistor devices and thermocouple devices have, heretofore, been manufactured separately. The disadvantage of having a separate thermocouple device and a separate thermistor device is that each device must have an independent probe member. Consequently, each probe member requires a separate and corresponding cavity within the heater device. To form a plurality of cavities in a heater device, usually limited in area, is a difficult and expensive undertaking.

Furthermore, since in an arrangement of the type described, the thermistor and thermocouple probe members occupy separate cavities in different areas of the heater device, the temperature sensed by the thermocouple device may be different from the temperature sensed by the thermistor device. One reason for such a variance in temperature is due to the different positions of the cavities relative to the heating elements within the heater device, and a further reason for temperature differences is due to the relative positions of the several cavities in the heater device in relation to the path of the yarn passing thereover. Since the heater device loses heat to the yarn, a cavity positioned nearer the plane of the path of the yarn will be a "cooler" cavity.

Thus, due to the possibility of variance in the respective temperatures which may be sensed by the separate thermistor device and the thermocouple device, the temperature indicated on the recorder is not an accurate and dependable guide or cross-reference with which to relate the controlled temperature of the heater device and therefore does not give an operator a positive and reliable check of the performance of the controller device.

It is an object of this invention to provide a novel thermoelectric sensing apparatus of the type adapted to provide accurate interrelated temperature measurements. Another object is to provide composite thermoelectric sensing apparatus, compact and inexpensive, possessing a common probing member. Another object is to provide thermoelectric sensing apparatus of the type in which a pair of different thermoelectric sensors are compounded in a specific manner to permit dual sensing of temperature from a single probing area. A further object is to provide a noved thermocouple-thermistor device wherein the measuring junction of a thermocouple and a thermistor element are embedded within a common glass shield. A further object is to provide a thermocouple thermistor device adapted to transmit E.M.F. and resistivity signals detected from a single probing area of a thermal device, such as a heater, to a recorder and a controller, respectively.

Other objects and advantages of the present invention will be apparent in view of the following description and the accompanying drawing, which is intended merely to be illustrative and not limitative.

According to the invention, there is provided a novel thermoelectric sensing apparatus of the type adapted to differentially sense temperature variations in a thermal or heater device and to provide precisely related measurements. In general, the invention comprises, in combination, a composite thermistor-thermocouple device having a thermistor element and one junction, the measuring junction, of a pair of dissimilar matched thermocouple lead wires embedded in sealed and spaced relation within a glass shield. The glass shield is suitably cemented within a hollow probe member closed at one end thereof. The thermocouple lead wires and a pair of thermistor lead wires which are fused at one end thereof to said thermistor element, extend outwardly of said probe member. The thermocouple and thermistor lead wires are insulatably covered intermediate their ends thereof. Connector means are secured at the outer ends of each of the thermocouple and thermistor lead wires. Preferably, a flexible armor sheath surrounds the thermocouple and thermistor lead wires in protective and fixed relation.

In operation, the single probe member is inserted into a corresponding recess formed within the heater device for dually sensing the temperature of the latter. The thermistor connector means are connected to terminals provided on a controller which is connected to the heater device through lead wires, and the thermocouple connector means are connected to terminals provided on a recorder. The recorder and the controller are each furnished with a source of electrical power supply.

Thus, in arranging the measuring junction of the thermocouple and the thermistor element in a common probe member in the specific manner described, the several measurements provided by the recorder and controller may be reliably and precisely interrelated.

Figure 2:
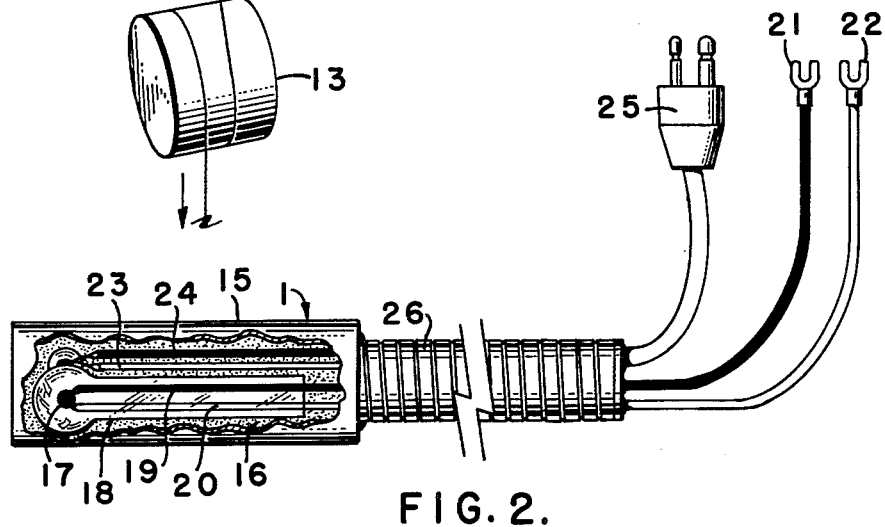

In the accompanying drawing:

FIGURE 1 is a view showing the novel thermoelectric sensing apparatus embodying the invention in association with a heater device, a recorder device, and a controller device; and, FIGURE 2 is a view showing the thermoelectric sensing apparatus with a portion of the side wall of the probe member 15 cut away for purposes of illustration.

Like components in the several figures in the drawing are designated by the same reference numerals for reasons of convenience and simplicity.

Referring to the drawing, the novel composite thermocouple-thermistor device 1 embodying the invention is shown in FIG. 1 in association with a heater device 2, a recorder device 3, and a controller device 4; devices 3 and 4 each being connected to a source of electrical power supply.

Heater device 2 has a heating element 5 mounted within a block 6, the heating element 5 being connected at each end thereof to a respective terminal 7 and 8 suitably arranged on block 6. A yarn 9 is shown forwarded to heater device 2 from a pair of feed rolls 10 and 11, and moving therefrom to and around a draw pin 12, and thence advancing to a draw roll 13. Yarn 9 is heated by block 6 and is thereafter stretched by draw roll 13 driven at a faster peripheral rate of speed in relation to the peripheral rate of speed of roll 11. A single recess 14 is formed within block 6.

The thermocouple-thermistor device 1, FIGS. 1 and 2, comprises a hollow probe member 15, preferably formed of stainless steel, closed at one end thereof and having a cavity 16 therein. Probe member 15 is adapted to fit into recess 14 of device 2 in sliding and connecting relation with the sidewall of recess 14.

A thermistor or resistor element 17 having a high negative coefficient of resistance is sealed within a glass shield 18 disposed within cavity 16 of probe member 15. Thermistor element 17 may be formed of platinum material and may be of bead, washer, or rod configuration.

A pair of spaced thermistor lead wires, 19 and 20, are each connected at one end thereof to the thermistor element 17 and are sealed within glass shield 18 adjacent their connected ends thereof. Lead wires 19 and 20 each extend exteriorly of probe member 15 and each have connectors 21 and 22, respectively, such as spade type connectors as shown in the drawing, secured at their opposite ends thereof. Each lead wire, 19 and 20, is insulatably covered intermediate its ends with a dielectric type material.

A pair of spaced thermocouple lead wires, 23 and 24, each formed of dissimilar matched metal, such as of iron-constantan combination, are joined at one so-called measuring end thereof, which is embedded in glass shield 18 in adjacent but spaced relation with thermistor element 17. Preferably, the measuring end of lead wires 23 and 24 are embedded in a separate glass bead fused to the glass shield as shown in the drawing. Metal lead wires 23 and 24 extend outwardly from glass shield 18 and exteriorly of probe member 15. At their end opposite the measuring junction thereof, metal lead wires 23 and 24 each have connector means secured thereto, illustrated as a plug 25 in the drawing, and each is insulatably covered intermediate its ends thereof.

Cavity 16 of probe member 15 is filled with a cementitious compound which fixedly anchors glass shield 18 within probe member 15.

Preferably, a sheath 26 or tube of flexible armor material is provided in surroundment of lead wires or conductors 19, 20, 23 and 24 for tightly binding the wires into a single bundle. Sheath 26 is securely bonded at one end thereof to the open end of probe member 15, and is secured at its opposite end to the four conductors in like manner to form an outer protective covering.

Plug 25 is connected to an outlet provided on recorder device 3. Device 3 may be of the common type comprising a bridge circuit, an amplifier, a slide wire, a pen connected to the slide wire, and a motor driven chart upon which the temperature is recorded.

The thermistor spade connectors 21 and 22 are suitably connected to a pair of corresponding terminals 27 and 28 provided on controller device 4. Device 4 may be of any usual type utilizing a bridge network, a slide wire, an amplifier, a relay, and a contact member to control the temperature of heater device 2 at a certain predetermined degree. Controller device 4 is connected to heater device 2 by means of a pair of lead wires 29 and 30 connected at one end thereof to a pair of terminals 31 and 32 on controller device 4 and connected at their opposite ends to terminals 7 and 8 on device 2. Device 4 is provided with an off-on toggle switch 33 for manually operating device 4 to respective off or on positions, and with a temperature control knob 34 for selectively controlling the temperature of the heater device 2 at a predetermined temperature.

It will be understood that thermistor element 17 is connected within the circuit of controller device 4, and that the thermocouple lead wires 23 and 24 become a part of the circuit within recorder device 2. Also, the single recess 14 in heater device 2 is located in an area on the block 6 where the temperature of the heater block 6 is critical, usually in the plane of the path of yarn passing over the block 6.

With the off-on switch 33 of controller device 4 turned to the "on" position and with the control knob 34 set at some preselected temperature setting, the thermoelectric apparatus will operate in the following manner.

Heat will be supplied to heater device 2 at a predetermined amount determined by the resistance offered by thermistor element 17 as determined by the setting of the control knob 34 on the controller device 4. The measuring junction or hot end of the thermocouple lead wires 23 and 24 will sense the temperature of block 6 and will send E.M.F. signal to recorder device 3. Device 3 will translate the E.M.F. signal through the bridge circuit and will record the temperature on the chart continuously.

As a consequence of the thermistor element 17 and the measuring junction of lead wires 23 and 24 being integrated in one probe member 15 in the manner described making it possible for both to be inserted into a single exploring recess 14, the E.M.F. signal sent from the lead wires 23 and 24, and the resistivity signal sent by the thermistor element 17 through lead wires 19 and 20, will be accurately related signals. Thus, an operator can reliably depend upon the temperature shown on the recorder chart to give him a relatively true idea of the performance of controller device 4.

The composite thermocouple thermistor device 1, being of unitary construction, further provides desirable features of compactness and economy.

It is to be understood that changes and variations may be made without departing from the spirit and scope of the invention as defined in the appended claim.

What is claimed is:

Thermoelectric sensing apparatus for variously detecting variations in temperature in a heater device, said apparatus comprising, in combination, a thermocouple-thermistor assembly having a hollow probe member open at one end thereof and having a cavity therein filled with cement, a glass shield member fixedly embedded within said cement in said cavity, a thermistor element sealed within said glass shield member, a pair of spaced thermistor lead wires each secured at one end thereof to said thermistor element within said glass shield member and each extending exteriorly of said hollow probe member, first connector means secured at the other end of each of said thermistor lead wires, each of said thermistor lead wires being insulatably covered intermediate its ends thereof, a pair of spaced thermocouple lead wires joined at one end thereof, said joined end of said thermocouple lead wires being sealed within a glass bead fused to said glass shield member adjacent to said thermistor element, said thermocouple lead wires extending exteriorly of said hollow probe member, second connector means secured at the other end of each of said thermocouple lead wires opposite said joined end thereof, each of said thermocouple lead wires being insulatably covered intermediate its ends thereof, and a protective flexible sheath closely surrounding said thermistor and thermocouple lead wires intermediate their ends thereof, said flexible sheath being secured at one end thereof to the open end of said hollow probe member and being secured to said thermistor and thermocouple lead wires at the opposite end thereof; a controlled heater device having a pair of terminals and a recess therein, said hollow probe member of said thermocouple-thermistor assembly being inserted into said recess of said heater device in connected relation therewith; a recorder device for continuously recording the temperature of said heater device, said recorder device being connected to a source of power and having an outlet therein, said second connector means of said thermocouple-thermistor assembly being connected to said recorder outlet; and a controller device for controlling the temperature of said heater device according to signals received from said thermistor element of said thermocouple-thermistor assembly, said controller device being connected to a source of electrical power and having a pair of terminals connected to said first connector means of said thermocouple-thermistor assembly, said controller device being connected to said pair of terminals of said heater device by means of controller lead wires, whereby the temperature recorded by said recorder device accurately reflects the performance of said controller device.

References Cited by the Examiner
UNITED STATES PATENTS

| | | | |
|---|---|---|---|
| 1,621,396 | 3/27 | Collins | 73—339 X |
| 2,463,427 | 3/49 | Richards | 73—359 |
| 2,598,236 | 5/52 | Dickey | 219—20.41 X |
| 2,706,411 | 4/55 | Bircher | 73—359 |
| 2,919,580 | 1/60 | McConnell | 73—362 |
| 2,924,099 | 2/60 | Crawford | 73—343 X |
| 2,962,898 | 12/60 | Burling | 73—359 X |

ISAAC LISANN, *Primary Examiner.*
LEONARD FORMAN, *Examiner.*

---

UNITED STATES PATENT OFFICE

CERTIFICATE OF CORRECTION

Patent No. 3,186,227                          June 1, 1965

Paul D. Barlow

It is hereby certified that error appears in the above numbered patent requiring correction and that the said Letters Patent should read as corrected below.

Column 1, line 26, for "command" read -- communal --; line 38, for "of a" read -- at a --; column 2, line 26, for "noved" read -- novel --; column 4, line 38, after "send" insert -- an --.

Signed and sealed this 26th day of October 1965.

(SEAL)
Attest:

ERNEST W. SWIDER                                             EDWARD J. BRENNER
Attesting Officer                                                    Commissioner of Patents

UNITED STATES PATENT OFFICE
CERTIFICATE OF CORRECTION

Patent No. 3,186,227                                   June 1, 1965

Paul D. Barlow

It is hereby certified that error appears in the above numbered patent requiring correction and that the said Letters Patent should read as corrected below.

Column 1, line 26, for "command" read -- communal --; line 38, for "of a" read -- at a --; column 2, line 26, for "noved" read -- novel --; column 4, line 38, after "send" insert -- an --.

Signed and sealed this 26th day of October 1965.

(SEAL)
Attest:

ERNEST W. SWIDER
Attesting Officer

EDWARD J. BRENNER
Commissioner of Patents